Figure 1:
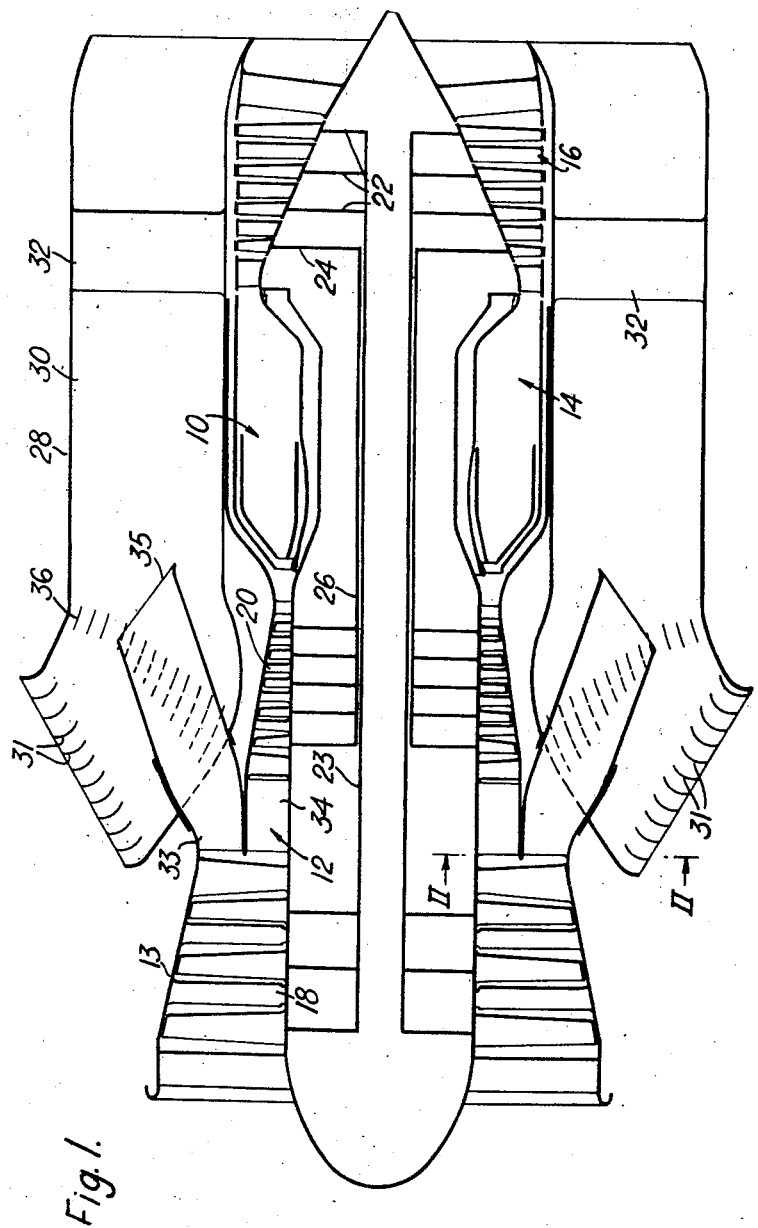

Dec. 25, 1962  A. A. GRIFFITH  3,069,848
JET LIFT GAS TURBINE ENGINES HAVING THRUST
AUGMENTING AND SILENCING MEANS
Filed Jan. 11, 1960  2 Sheets-Sheet 1

Inventor:
Alan Arnold Griffith,
By
Cushman, Darby & Cushman
Attorneys 3,069,848
Patented Dec. 25, 1962

3,069,848
JET LIFT GAS TURBINE ENGINES HAVING THRUST AUGMENTING AND SILENCING MEANS
Alan Arnold Griffith, Derby, England, assignor to Rolls-Royce Limited, Derby, England, a company of Great Britain
Filed Jan. 11, 1960, Ser. No. 1,550
Claims priority, application Great Britain Feb. 23, 1959
4 Claims. (Cl. 60—35.6)

This invention relates to gas turbine jet lift engines. The term "lift engines" is to be understood to mean gas turbine engines which are adapted to provide vertical lift for an aircraft independently of the aerodynamic lift produced by forward flight of the aircraft.

The object of the invention is to provide an engine which enables a given thrust to be obtained for a smaller fuel consumption than in known engine arrangements or conversely enables the engine thrust to be substantially increased for only a small increase in fuel consumption, and in which the means employed for increasing the thrust also produce a silencing effect on the exhaust gases issuing from the engine.

According to the invention in its broadest form, a gas turbine jet lift engine comprises conduit means having at least one inlet communicating with the compressor means of the engine so as to be adapted to be supplied with compressed air therefrom and having at least one outlet arranged externally of and adjacent to the engine, said conduit means being open to ambient air so that ambient air may be drawn into the conduit means by the compressed air passing through the conduit means, and said outlet directing the air passing therethrough into an annulus which bounds the jet gases issuing from the engine.

According to a preferred embodiment of the present invention, gas turbine jet lift engine is disposed within an axially extending casing, the inner periphery of the casing being radially spaced apart from the outer periphery of the engine to define therewith an annular passage open at each end and through which ambient air can pass, means being provided to conduct compressed air from the compressor means of the engine to the passage and direct it in a downstream direction relative to the flow of working fluid through the engine, whereby an ejector effect is produced at the outlet or outlets of the air conducting means so that the velocity of the ambient air entering and leaving the annular passage is increased.

Such an arrangement provides a gas turbine jet lift engine which enables a given thrust to be obtained with a smaller engine and smaller fuel consumption than with the known engine arrangements.

At the same time, since the said annulus bounding the jet gases issuing from the engine has a greater total pressure and velocity than the ambient air, the initial velocity step between the jet gases and ambient air is reduced. This reduces turbulence and thus provides a silencing effect.

The air conducting means preferably comprises a plurality of tubes whose outlets face downstream of the annular passage and which have a flattened cross section.

The invention is applicable to engines having more than one compressor, and where the engine has a multi-stage compressor the compressed air is preferably bled off from a point intermediate of two of the compressors.

Figure 2:
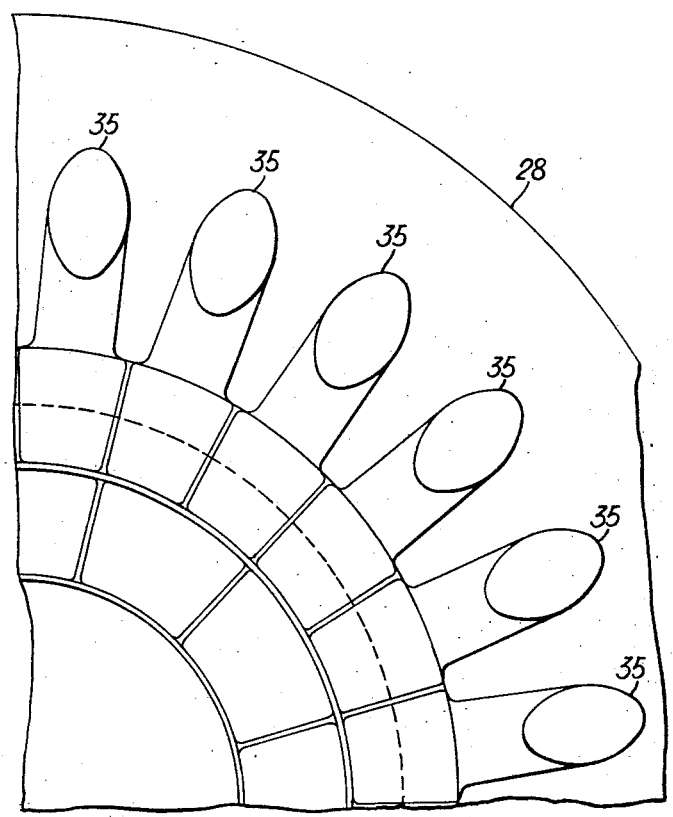

One particular arrangement of a gas turbine jet engine in accordance with the invention will now be particularly described, by way of example only, with reference to the accompanying drawings, in which:

FIGURE 1 is a sectional view of a jet lift gas turbine engine according to the present invention, and FIGURE 2 is a sectional view on the line II—II in FIGURE 1.

Referring to the drawings, 10 indicates a jet lift gas turbine engine having a compressor 12, combustion equipment 14 and a turbine 16. The compressor 12 has a low pressure portion 18 and a high pressure portion 20, the low pressure portion 18 being connected to the low pressure stages 22 of the turbine 16 by means of a shaft 23, while the high pressure portion 20 of the compressor is connected to the high pressure stage 24 of the turbine by means of a shaft 26, the shaft 26 being concentric with the shaft 23.

The engine 10 is disposed in a cylindrical casing 28 which is open at each end and which has a larger internal diameter than the greatest external diameter of the engine, the engine and the casing being arranged coaxially whereby an annular passage 30 is defined between them. One end, hereinafter referred to as the inlet, of the casing 28 is disposed adjacent to the inlet to the compressor 12, and is flared outwardly, as shown in FIGURE 1 of the drawings.

The inlet of the casing 28 is provided with a plurality of guide vanes 31 which are adapted to prevent or substantially reduce swirling of air entering the passage 30.

Struts 32, which extend radially outwardly from the engine 10, are connected to the inner periphery of the casing 28 to connect the engine and the casing rigidly together, each strut 32 having an aerofoil cross-sectional shape.

The compressor 12 has a casing 13, the portion of the casing 13 which extends between the low pressure and high pressure portions of the compressor 12 being divided into two separate annular arrays of channels or ducts 33 and 34, each duct 33 communicating with the passage 30 through a pipe or transfer tube 35 while each duct 34 is in direct communication with the high pressure portion of the compressor.

Each transfer tube 35 and its associated duct is shaped so that it maintains a uniform cross-sectional area throughout their overall length in order to prevent a loss of pressure occurring in air passing therethrough.

The transfer tubes 35 are also arranged so that their outlets are directed towards the downstream end of the engine.

As can be seen from the drawings, the outlet ends of the transfer tubes 35 are disposed in spaced apart relationship to allow ambient air to flow through the passage 30 in a downstream direction relative to the direction of flow of working fluid through the engine.

As can be seen from FIGURE 1 of the drawings, a further series of guide vanes 36 are provided in the annular passage 30 downstream of the guide vanes 31. The guide vanes 36 are arranged to obviate any swirling in the air passing into the straight portion of the casing 28 from the flared inlet, whereby smooth linear flow is produced in the passage 30.

When the above described engine is in use, ambient air enters the low pressure portion 18 of the compressor 12 through the compressor intake. It is then compressed, and a proportion of it, say 40% passes into the high pressure portion 20 of the compressor where it is further compressed. The compressed air then passes into the combustion equipment 14 of the engine where it mixes with fuel to form a combustible mixture, the products of combustion passing through the turbine to drive the compressors and provide a propulsive thrust as they exhaust to atmosphere.

The remaining proportion of the air, passing from the low pressure portion of the compressor passes through the transfer tubes 35 and is discharged into the annular passage 30, and since such air has a higher velocity and pressure than ambient air, with which the passage 30 is in direct communication, an ejector effect will be produced at the outlets of the transfer tubes.

The ejector effect causes a pressure drop immediately upstream of the outlets of the transfer tubes 35 whereby ambient air is drawn into the passage 30 through the inlet thereof, the velocity of the ambient air passing through the passage 30 being increased by said ejector effect.

The pressure in the passage 30, downstream of the outlets of the tubes 35, is substantially greater than that of the ambient air. As a result, the propulsive thrust is increased without substantial increase of the fuel consumption, and, at the same time, silencing of the exhaust gases issuing from the engine is effected.

The silencing effect is brought about by the annulus of air issuing from the passage 30 which completely surrounds the stream of exhaust gases issuing from the engine. This annulus of air has a greater velocity than that of the ambient air, whereby the initial velocity step between the exhaust gases and ambient air is reduced, with consequent reduction of turbulence.

It will be appreciated, of course, that although in the particular embodiment described above the engine has two compressors in flow series, the invention is also applicable to engines having a single compressor.

I claim:

1. A jet lift power plant comprising: a gas turbine jet propulsion engine having compressor means, combustion means and turbine means arranged in flow series, said compressor means comprising concentric inner and outer casings defining an annular air duct therebetween and compressor blading disposed in said air duct; an annular engine casing within which said combustion means and said turbine means are mounted, the upstream end of said engine casing being disposed adjacent the downstream end of said compressor blading substantially midway radially between said inner and outer casings, whereby said engine casing defines with said inner and outer casings respectively first and second annular compressed air outlet ducts, the cross-sectional area of the first compressed air outlet duct being less than that of the second, casing means concentrically surrounding said engine casing, said casing means defining an annular ambient air passage and being provided with an annular ambient air inlet which opens facing laterally outwardly of the engine axis, and an annular ambient air outlet; and an annular duct means having an inlet for receiving air compressed by said blading concentrically from said second annular compressed air outlet duct and an outlet for concentrically discharging the same into said annular ambient air passage, said duct means providing open communication between said second annular compressed air outlet duct and said annular ambient air passage for delivering at least half the air compressed by said compressor blading into said passage so that ambient air is drawn into the ambient air inlet and discharged through said ambient air outlet in an annular stream surrounding the exhaust gases issuing from the engine, whereby air passing through said passage provides an appreciable contribution to total thrust from said engine and produces a silencing effect to exhaust gases issuing from the engine.

2. A jet lift power plant as claimed in claim 1 in which said ambient air inlet is provided at its outwardly facing opening with a plurality of guide vanes which extend spanwise at right angles to the engine axis, said guide vanes being curved chordwise to deflect ambient air along said passage, the guide vanes adjacent their leading edges extending chordally at right angles to the engine axis.

3. A power plant as claimed in claim 1 wherein said means to conduct compressed air includes a plurality of tubes angularly spaced about said engine and each having one end thereof continuously open to said second annular compressed air outlet duct and the other end thereof open to the annular ambient air passage.

4. A power plant as claimed in claim 3 wherein each of said tubes is flattened in cross section and has a substantially uniform cross sectional area throughout.

References Cited in the file of this patent

UNITED STATES PATENTS

| | | |
|---|---|---|
| 2,577,919 | Roy | Dec. 11, 1951 |
| 2,610,465 | Imbert et al. | Sept. 16, 1952 |
| 2,652,216 | Hoffman | Sept. 15, 1953 |
| 2,672,726 | Wolf et al. | Mar. 23, 1954 |
| 2,735,612 | Hausmann | Feb. 21, 1956 |
| 2,873,576 | Lombard | Feb. 17, 1959 |
| 2,936,973 | Kappus | May 17, 1960 |

FOREIGN PATENTS

| | | |
|---|---|---|
| 972,222 | France | Aug. 23, 1950 |
| 972,223 | France | Aug. 23, 1950 |
| 1,086,315 | France | Aug. 11, 1954 |